United States Patent
Koide et al.

(10) Patent No.: US 9,857,516 B2
(45) Date of Patent: Jan. 2, 2018

(54) FRONT PLATE OF TN LIQUID CRYSTAL DISPLAY DEVICE

(75) Inventors: Koshi Koide, Chiba (JP); Osamu Kakinoki, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 13/879,176

(22) PCT Filed: Sep. 22, 2011

(86) PCT No.: PCT/JP2011/072489
§ 371 (c)(1),
(2), (4) Date: Jul. 1, 2013

(87) PCT Pub. No.: WO2012/049977
PCT Pub. Date: Apr. 19, 2012

(65) Prior Publication Data
US 2013/0272020 A1 Oct. 17, 2013

(30) Foreign Application Priority Data
Oct. 13, 2010 (JP) .................... 2010-230613

(51) Int. Cl.
F21V 8/00 (2006.01)
G02B 1/14 (2015.01)
(Continued)

(52) U.S. Cl.
CPC ............ *G02B 6/0011* (2013.01); *G02B 1/105* (2013.01); *G02B 1/14* (2015.01); *G02B 5/3083* (2013.01);
(Continued)

(58) Field of Classification Search
None
See application file for complete search history.

(56) References Cited

U.S. PATENT DOCUMENTS

2009/0088504 A1* 4/2009 Chatterjee et al. ............ 524/158
2009/0128758 A1   5/2009 Mori et al.
(Continued)

FOREIGN PATENT DOCUMENTS

CN 101068845 A 7/2007
JP 6-258634 9/1994
(Continued)

OTHER PUBLICATIONS

Search report from E.P.O., dated Nov. 17, 2014.
(Continued)

*Primary Examiner* — Anthony J Frost
(74) *Attorney, Agent, or Firm* — Greenblum & Bernstein, P.L.C.

(57) ABSTRACT

The problem is to provide a front plate of a TN liquid crystal display device capable of reducing occurrence of color unevenness caused by retardation of a polycarbonate resin sheet, even when the liquid crystal panel is observed through polarizing glasses or liquid crystal shutter glasses for 3D, while having excellent impact resistance, heat resistance and transparency.

The solution means are that the direction of the slow axis or the fast axis of a polycarbonate resin sheet is parallel to the lengthwise direction of a TN liquid crystal panel, and that retardation is not less than 5000 nm.

8 Claims, 5 Drawing Sheets

(51) Int. Cl.
*G02B 1/10* (2015.01)
*G02B 5/30* (2006.01)
*G02F 1/1333* (2006.01)
*G02F 1/1335* (2006.01)
*G02F 1/13363* (2006.01)
*G02F 1/139* (2006.01)
*G02B 27/22* (2006.01)
*G02B 27/26* (2006.01)

(52) U.S. Cl.
CPC .. *G02F 1/133308* (2013.01); *B32B 2457/202* (2013.01); *G02B 27/2264* (2013.01); *G02B 27/26* (2013.01); *G02F 1/1396* (2013.01); *G02F 1/13363* (2013.01); *G02F 1/133603* (2013.01); *G02F 2001/133331* (2013.01)

(56) References Cited

U.S. PATENT DOCUMENTS

| 2009/0147196 A1* | 6/2009 | Horie et al. ............ 349/122 |
| 2010/0129587 A1* | 5/2010 | Terauchi .................. 428/65.1 |
| 2010/0208177 A1* | 8/2010 | Kobayashi ........... G02B 5/3083 349/102 |

FOREIGN PATENT DOCUMENTS

| JP | 06258634 A | * | 9/1994 | ........... G02F 1/1335 |
| JP | 2006-103169 | | 4/2006 | |
| JP | 2010-85978 | | 4/2010 | |
| JP | 2010-179640 | | 8/2010 | |
| JP | 2010179640 A | * | 8/2010 | |
| JP | 2010188719 A | | 9/2010 | |
| WO | WO 2006059702 | * | 6/2006 | |
| WO | 2006/059702 A1 | | 8/2006 | |

OTHER PUBLICATIONS

Japanese Office Action issued with respect to application No. 2012-538627, dated Aug. 18, 2015.
Taiwanese Office Action issued with respect to application No. 100136477, dated Jul. 27, 2015.
Chinese Office Action issued with respect to application No. 201180055439.9, dated Feb. 28, 2015.
Japanese Office Action issued with respect to application No. 2012-538627, dated May 12, 2015.
Notification of Reasons for Revocation in respect to Japanese Application No. 2016-700671 with English Translation, dated Sep. 29, 2016.
U.S. Appl. No. 13/824,157 to Koshi Koide et al., filed Mar. 15, 2013.

* cited by examiner (a) Samples of Conventional Example
Re=2520~2800nm (ΔRe=280nm)

(b) Samples of the Invention
Re=5250~6300nm (ΔRe=1050nm)

(a)

(b)

(c)

(d)

FRONT PLATE OF TN LIQUID CRYSTAL DISPLAY DEVICE

TECHNICAL FIELD

This invention relates to a front plate of a TN liquid crystal display device, particularly to a front plate of a TN liquid crystal display device capable of reducing occurrence of coloring and color unevenness, caused by retardation of a polycarbonate resin sheet and unevenness thereof, even when the liquid crystal display device is observed through polarizing glasses or liquid crystal shutter glasses for 3D, while having excellent impact resistance, heat resistance and transparency.

RELATED ART

For the purpose of protecting a liquid crystal panel and the like, a front plate of the liquid crystal display device is provided. Materials used for a conventional front plate of a liquid crystal display include a (meth)acryl resin represented by poly(methyl methacrylate) (PMMA).

Moreover, in recent years, a front plate comprising a sheet of polycarbonate resin has been used, in terms of having high impact resistance, heat resistance, secondary processability, light weight, transparency and the like. Particularly, a front plate of a liquid crystal display device having a hard coat provided on a multiple layer sheet having an acryl resin laminated on a surface layer of a polycarbonate resin sheet, which has excellent impact resistance, heat resistance, processability and transparency of a polycarbonate resin while having surface hardness and scratch resistance equivalent to a conventional acryl resin with a hard coat, has been widely adopted as a liquid crystal display front plate (For example, see Patent Document 1).

The above front plate of a liquid display device comprising a polycarbonate resin sheet is typically formed by a melt extrusion method with an acryl resin.

In a polycarbonate resin sheet formed by a melt extrusion method, molecules constituting a polycarbonate resin orientate due to influences of resin temperature, cooling roll temperature, take-up speed and the like, and cause retardation. Here, "retardation" in the invention is represented by $(nx-ny) \times d$ in a nm unit, wherein nx is the principal refractive index of the slow axis within a sheet surface, ny is the principal refractive index of the fast axis, and d is the thickness of a sheet.

In addition, regarding an acryl resin, since the appearance of orientated double refraction by stretching is extremely limited, retardation can be considered to be substantially 0. Also, since a hard coat layer is a cured resin product at a non-orientated state having a three dimensional network structure by a crosslinking reaction and the thickness is as thin as about a few microns, retardation can similarly be considered to be substantially 0.

When a polycarbonate resin sheet with such retardation is cut aligning the lengthwise and widthwise sides to the extrusion direction upon production, and used as a front plate of a liquid crystal display device releasing polarized light in the vertical direction of a TV screen such as VA mode or IPS mode, the transmission axis of a polarizing plate on the liquid crystal display device front surface becomes parallel to the fast axis or the slow axis within a surface of a polycarbonate resin sheet, and polarized light from a liquid crystal display device passes through a front plate while maintaining the vertical direction of a screen. Therefore, when an image displayed on a liquid crystal display is observed with polarizing glasses or TN liquid crystal shutter glasses for 3D with the transmission axis in the vertical direction, a usual image can be seen unless the head is inclined.

However, when the polycarbonate resin sheet described above is used as a front plate of a TN liquid crystal display device releasing polarized light of an angle of 45° widely used as a personal computer monitor and the like, since the transmission axis of a polarizing plate on the TN liquid crystal panel front surface and the fast axis or the slow axis within a surface of a polycarbonate resin sheet of a front plate form an angle of 45°, it is converted into various elliptically-polarized light depending on the above retardation of a front plate and wavelength. Therefore, there is a problem that when an image displayed on a liquid crystal display is observed with polarizing glasses or TN liquid crystal shutter glasses for 3D with the transmission axis in the vertical direction, the light transmittance varies depending on wavelength, and so-called interference color from parallel nicols to crossed nicols is observed in an image.

Furthermore, there is a problem that when retardation of a polycarbonate resin sheet of the above front plate has unevenness within a surface, it thereby becomes an image with further poor visibility.

PRIOR ART DOCUMENT

Patent Document 1: JP-A-2006-103169

SUMMARY OF THE INVENTION

Problem to be Solved by the Invention

The object of the invention is, by trying to optimize a polycarbonate resin sheet, to provide a front plate of a TN liquid crystal display device capable of reducing occurrence of coloring and color unevenness, caused by retardation of a polycarbonate resin sheet and unevenness thereof, even when the liquid crystal panel is observed through polarizing glasses or liquid crystal shutter glasses for 3D, while having excellent impact resistance, heat resistance and transparency.

Means for Solving the Problem

The inventors have, as a result of keen examinations to solve the above problem for a front plate of a TN liquid crystal display device comprising a polycarbonate resin sheet and using a white LED light source, discovered that by making retardation of the polycarbonate resin sheet to be as large as not less than 5000 nm, distribution of the retardation on the color diagram is located on a region near white, and variations of distribution become lower, so occurrence of coloring and color evenness can be reduced.

The invention is made based on such findings, and the summary is as follows.

(1) A front plate of a TN liquid crystal display device comprising a polycarbonate resin sheet and using white LED as a light source of a backlight, wherein a direction of the slow axis or a fast axis of the polycarbonate resin sheet is parallel to a lengthwise direction of the TN liquid crystal panel, and retardation is not less than 5000 nm.

(2) A front plate of a TN liquid crystal display device according to the above item (1), wherein a polycarbonate resin constituting the polycarbonate resin sheet has 2,2-bis (4-hydroxyphenyl)propane as a main raw material monomer, a viscosity average molecular weight within a range of 20,000 to 30,000, and a glass transition temperature within a range of 130 to 160° C.

(3) A front plate of a TN liquid crystal display device according to the above item (1), wherein a thickness of the polycarbonate resin sheet is within a range of 0.3 to 2 mm.

(4) A front plate of a TN liquid crystal display device according to the above item (1), further comprising a hard resin layer with a thickness within a range of 30 to 100 μm and a pencil hardness at a laminated state measured according to JIS5600-5-4 of at least F or more, obtained by coextrusion molding with the polycarbonate resin provided on a front surface or both surfaces of the polycarbonate resin sheet.

(5) A front plate of a TN liquid crystal display device according to the above item (1), wherein the hard resin layer consists of an acryl resin, a resin (nuclear hydrogenated MS resin) obtained by hydrogenating an aromatic ring of a copolymer obtained by polymerizing at least one kind of (meth)acrylate ester monomer and at least one kind of aromatic vinyl monomer, or a modified polycarbonate resin having 2,2-bis(4-hydroxy-3-methylphenyl)propane or 2,2-bis(4-hydroxy-3-methylphenyl)cyclohexane as a main raw material monomer.

(6) A front plate of a TN liquid crystal display device according to the above item (5), wherein the acryl resin has methyl methacrylate as a main raw material monomer and a glass transition temperature of not less than 95° C.

(7) A front plate of a TN liquid crystal display device according to the above item (5), wherein the nuclear hydrogenated MS resin is a resin obtained by hydrogenating an aromatic ring of a copolymer obtained by polymerizing methyl methacrylate and styrene, a copolymerization ratio of them is within a range of 60:40 to 90:10, and a hydrogenation ratio of an aromatic ring is not less than 70%.

(8) A front plate of a TN liquid crystal display device according to the above item (5), wherein the modified polycarbonate resin is a copolymer of 2,2-bis(4-hydroxy-3-methylphenyl)propane and 2,2-bis(4-hydroxyphenyl)propane, and a copolymerization ratio of them is 50:50 to 100:0.

(9) A front plate of a TN liquid crystal display device according to the above item (5), wherein the modified polycarbonate resin is a copolymer of 2,2-bis(4-hydroxy-3-methylphenyl)cyclohexane and 2,2-bis(4-hydroxyphenyl)propane, and a copolymerization ratio of them is 50:50 to 100:0.

(10) A front plate of a TN liquid crystal display device according to the above item (5), having a hard coat membrane formed on a frontmost surface or both of frontmost and backmost surfaces of the front plate.

(11) A front plate of a TN liquid crystal display device according to the above item (10), wherein the hard coat membrane consists of an ultraviolet curable acryl based resin composition, a thickness is within a range of 1 to 20 μm, and a pencil hardness at a laminated state measured according to JIS5600-5-4 is 3H or more.

Effect of the Invention

By using the front plate of a TN liquid crystal display device of the invention, it is possible to perform excellent impact resistance, heat resistance and transparency, and further inhibit occurrence of coloring and color unevenness, caused by retardation of a polycarbonate resin sheet and unevenness thereof, even when the liquid crystal panel is observed through polarizing glasses or liquid crystal shutter glasses for 3D.

MODE FOR CARRYING OUT THE INVENTION

Figure 1:
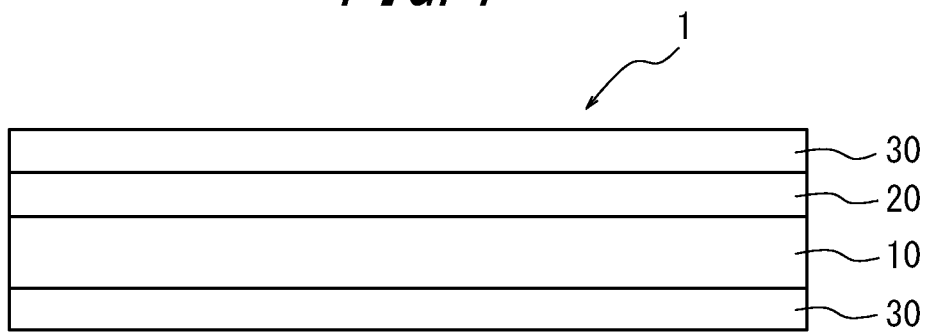
FIG. 1 is a view schematically showing a cross section of the front plate of a TN liquid crystal display device according to the invention.

A front plate of a TN liquid crystal panel of the invention comprises a polycarbonate resin sheet 10, as shown in FIG. 1. Here, the front surface of a polycarbonate resin sheet refers to a surface on the user side when used for a liquid crystal display, and the back surface refers to a surface on the liquid crystal panel side when used for a liquid crystal display.

Moreover, the front plate of a TN liquid crystal display device of the invention is characterized in that the direction of the slow axis or the fast axis of the polycarbonate resin sheet is parallel to the lengthwise direction of a TN liquid crystal panel, and that retardation is not less than 5000 nm.

Here, the slow axis refers to an axis where the refractive within a sheet surface is maximized, and the fast axis is an axis crossed with the slow axis within a surface and an axis where the refractive within a sheet surface is minimized. Also, the lengthwise direction of the liquid crystal panel refers to the lengthwise direction in the case of being used for a liquid crystal display device.

Figure 2:
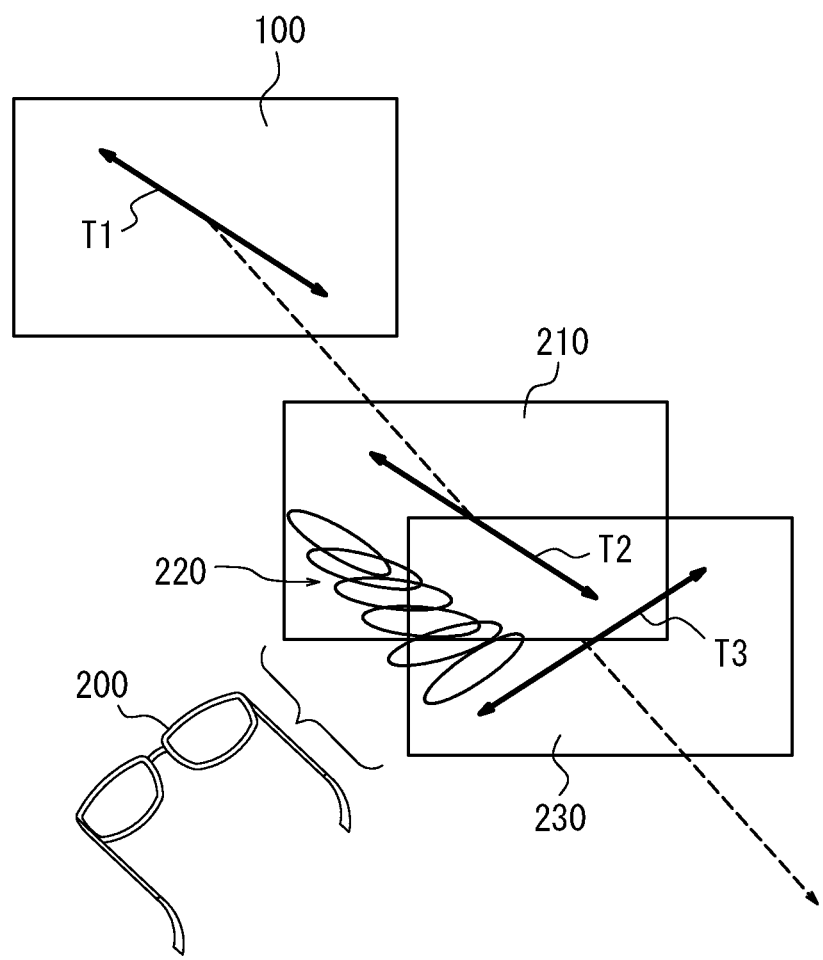
FIG. 2 is a view for illustrating a state when a TN liquid crystal panel is observed through liquid crystal shutter glasses for 3D.

FIG. 2 shows a state where a TN liquid crystal panel 100 is observed through liquid crystal shutter glasses for 3D 200.

When the conventional front plate 10 for a TN liquid crystal display device is used, polarized light with an angle of 45° from the front polarizing plate 100 of a liquid crystal panel transmits through a glasses front side polarizing plate 210 as it is and rotates at a twisted nematic liquid crystal layer 220, the polarized direction rotates by 90° (the polarized light transmission axis rotates by 90°), and it transmits through the transmission axis of a glasses back side polarizing plate 230 as it is. When a front plate is provided on the front surface of the liquid crystal panel 100, and arranged by aligning the fast axis or the slow axis of the polycarbonate resin sheet 10 with the vertical direction of a screen, there is a problem in that interference colour due to the parallel nicols is generated (colour unevenness caused by retardation unevenness within a surface also occurs), as described above.

Therefore, in the invention, by setting retardation of the polycarbonate resin sheet 10 to be not less than 5000 nm, since distribution of the retardation on a color diagram is located in a region near white and variations of distribution are small, occurrence of interference due to parallel nicols caused by retardation of the polycarbonate resin sheet 10 color and unevenness thereof can effectively be inhibited.

Here, the front surface of the liquid crystal panel 100 and the glasses front side polarizing plate 210 are in the relationship of parallel nicols and the liquid crystal display device front plate 1 is placed therebetween, and the transmission axes (having the same direction) of two polarizing plates and the slow axis or the fast axis of a refractive index ellipsoid of the polycarbonate resin sheet 10 of the liquid crystal display device front plate 1 are in the arrangement of being crossed by 45°. In that case, wavelength dependency of the transmittance TT (λ) is represented by the following formula (1).

$$TT(\lambda)=\cos{}^2(\pi \times Re(\lambda)/\lambda) \quad (1)$$

Here, cos represents cosine function, it represents circular constant, λ represents wavelength, and Re (λ) represents wavelength dependency of retardation.

Figure 3:
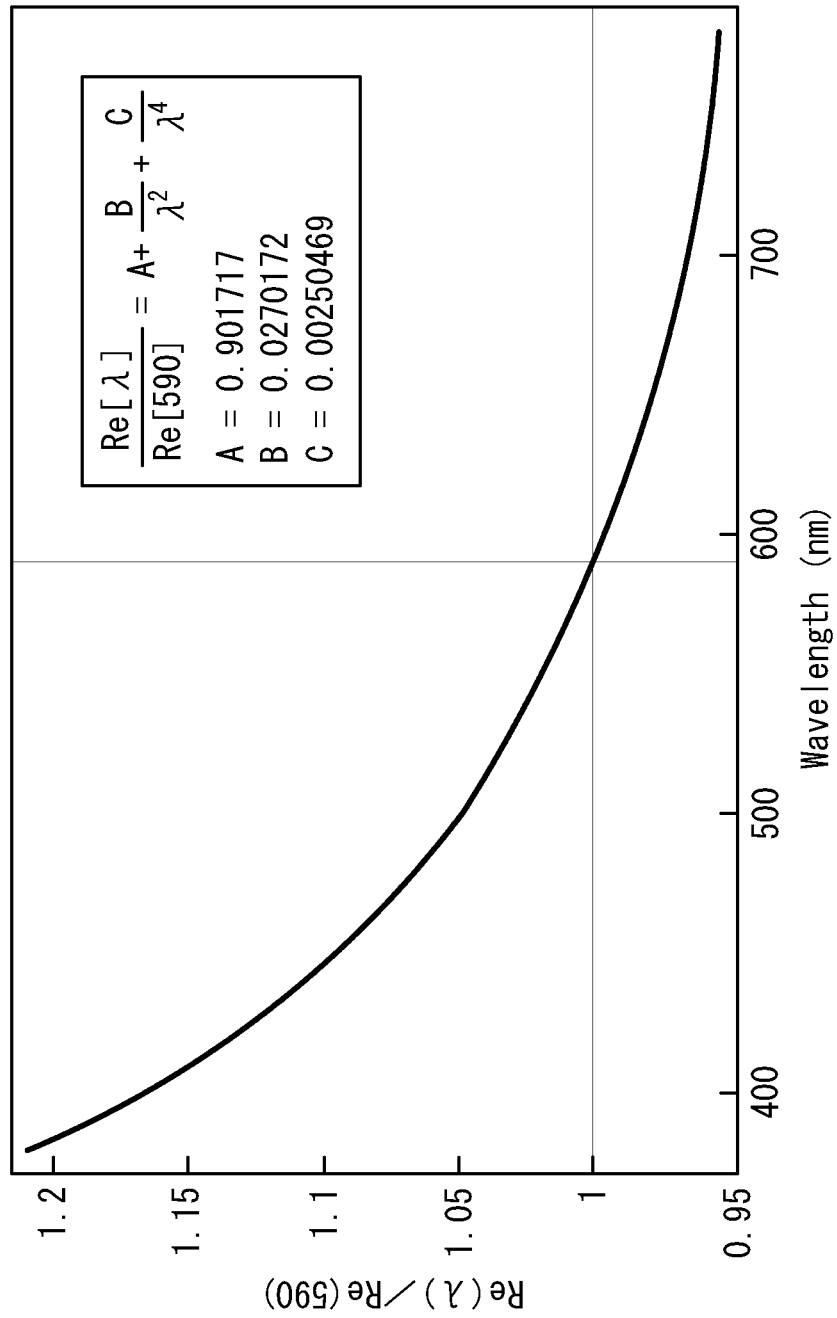
FIG. 3 is a graph where wavelength dependency Re (λ) of retardation of polycarbonate is standardized by retardation of 590 nm (sodium D line).
Figure 4:
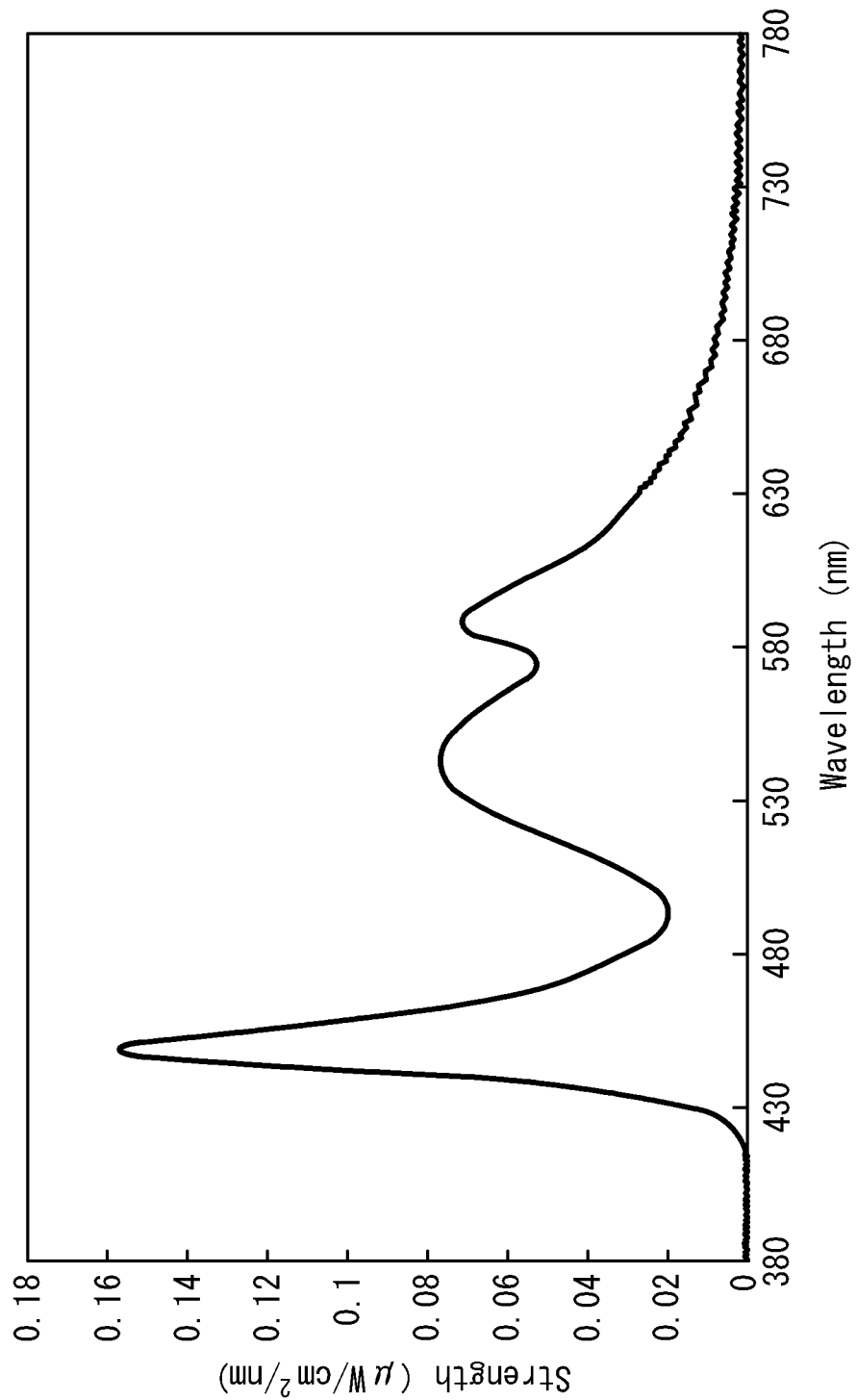
FIG. 4 is a graph showing light spectrum S (λ) measured by a light spectrum analyzer after displaying the entire light crystal monitor in white.

Moreover, FIG. 3 shows a graph of wavelength dependency of retardation Re (λ) of polycarbonate standardized by retardation of 590 nm (sodium D line). The numerical formula in the figure is an approximation formula of Caucy. Furthermore, FIG. 4 shows light spectrum S (λ) measured by a light spectrum analyzer after displaying the entire liquid crystal monitor in white. In addition, a light source used in a liquid crystal monitor in this regard is white LED, single chip type LED where yellow and red are fluorescence excited to illuminate by blue LED illumination and the balance thereof results in white.

Transmittance TT (λ) under parallel nicols of Formula 1, light spectrum S (λ) of FIG. 3, and each of the color matching functions (spectrum stimulus values) of CIE1931 x (λ), y (λ) and z (λ) are overlap integrated to calculate X, Y and Z and calculate x=X/(X+Y+Z) and y=Y/(X+Y+Z) on the color diagram of optional retardation Re (λ). In addition, the integrated wavelength region is set to be 380 to 780 nm in the vision light region.

In order to calculate color unevenness when used as a liquid crystal display device front plate, for samples of a liquid crystal display device front plate of a conventional example and samples of a liquid crystal display device front plate of the invention, unevenness of retardation at a wavelength of 590 nm is measured by a spectroscopic ellipsometer and plotted on a color diagram. Here, retardation (Re) of samples of the conventional example is 2520 to 2800 nm and unevenness of retardation (ΔRe) is 280 nm, and retardation of samples of the invention is 5250 to 6300 nm and unevenness of retardation (ΔRe) is 1050 nm. Distribution of samples of the conventional example on the color diagram is shown in FIG. 5 (a), and distribution of samples of the invention on the color diagram is shown in FIG. 5 (b).

Figure 5:
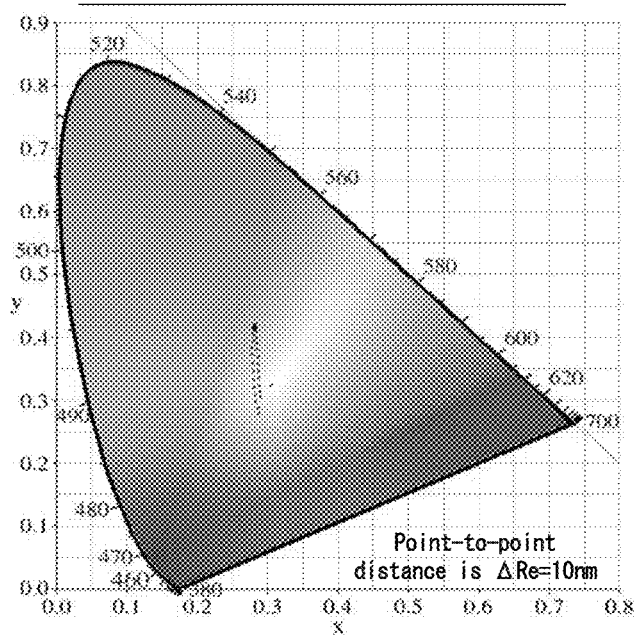
FIG. 5 is a series of graphs showing distribution on color diagram for variations of retardation of each sample, wherein (a) shows the case of using a conventional front plate of a TN liquid crystal display device, and (b) shows the case of using the front plate of a TN liquid crystal display device of the invention.
Figure 5:
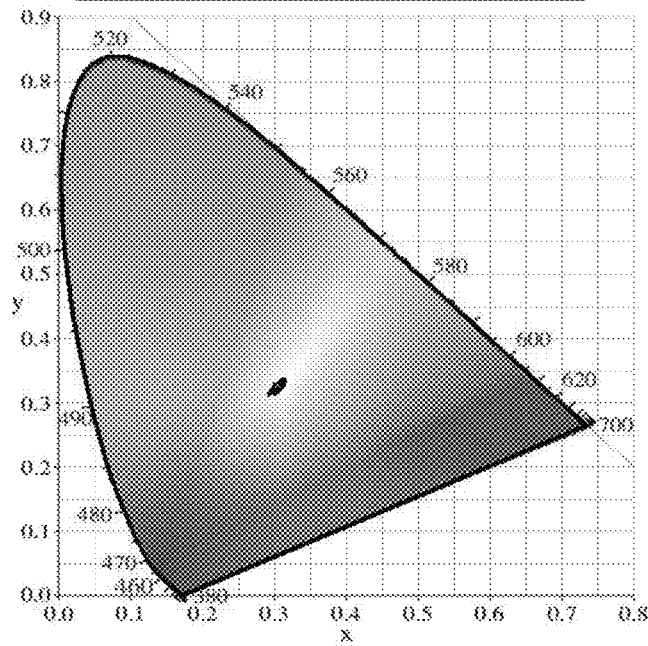

From FIG. 5 (a), since variations of color are seen in distribution of unevenness of retardation (shown as black points) for samples of the conventional example, it is clear that coloring and color unevenness occur when used as a product. On the other hand, from FIG. 5 (b), since distribution of unevenness of retardation (black points) for samples of the invention is all located in a region near white and variations of color are small, occurrence of coloring and color unevenness can also be inhibited when used as a product. Since this effect is significantly seen when retardation of the polycarbonate resin sheet 10 is not less than 5000 nm, it is important to make retardation to be not less than 5000 nm.

In the invention, for a light source of a liquid crystal backlight illustrating light to the front plate 1 of the TN liquid crystal display device, a single chip type white LED is required to be used. It is because in other light sources, for example a light source having a spectrum shape with a peak at a particular wavelength, such as a cold cathode fluorescence lamp (CCFL) which is widely used, the effect of the invention cannot sufficiently be performed, even when retardation of the polycarbonate resin sheet 10 is not less than 5000 nm.

Below, each component of the front plate of a TN liquid crystal display device of the invention will be described.

(Polycarbonate Resin Sheet)

The front plate 1 of a TN liquid crystal display device of the invention comprises the polycarbonate resin sheet 10, as shown in FIG. 1. In the polycarbonate resin sheet 10, not shown in FIG. 2, is located on the front surface of 100 between 100 and 210 under the condition of the direction of the slow axis X or the fast axis Y as the lengthwise direction of a TN liquid crystal panel. Other configuration requirements (film thickness, material, production method, etc.) are not particularly limited.

Also, a polycarbonate resin constituting the polycarbonate resin sheet 10 is preferable to be a thermoplastic polycarbonate polymer capable of containing a branched structure obtained by a polycondensation reaction (interface method) between an aromatic dihydroxy compound and phosgene or obtained by an ester exchange reaction (melt method) between the aromatic dihydroxy compound and diester carbonate, and preferable to have 2,2-bis(4-hydroxyphenyl)propane as a main raw material monomer. It should be noted that to have the above 2,2-bis(4-hydroxyphenyl)propane as a main raw material monomer means to contain the raw material monomer in not less than 50%. A polycarbonate polymer of the raw material monomer has high heat stability and transparency, and is extremely preferable as a liquid crystal display device front plate. However, retardation is easy to occur in the sheet production step, and in order to control variations thereof, close attention is required to be paid. In addition, there are problems of large photoelasticity and large optical strain due to stress, but these problems can be solved by using a sheet with high retardation of the invention.

Moreover, the polycarbonate resin is preferable to have the viscosity average molecular weight within a range of 20,000 to 30,000. The viscosity average molecular weight within the above range is suitable to form the polycarbonate resin sheet 10 by normal extrusion molding, and when the viscosity average molecular weight is more than 30,000, sufficient processability is liable not to be obtained. Also, when the viscosity average molecular weight is less than 20,000, physical properties such as impact resistance are poor, which is not preferable.

Furthermore, the polycarbonate resin is preferable to have the glass transition temperature within a range of 130 to 160° C. When the glass transition temperature is less than 130° C., the characteristic of high heat resistance of a polycarbonate resin becomes weak, and for example, it becomes difficult to develop it into a product for in vehicle application highly likely to be exposed to high temperature. On the other hand, when the glass transition temperature is more than 160° C., the set temperature upon extrusion molding must be high, and problems such as deterioration of color phase and generation of foreign substances are easy to occur.

Also, various additives typically used may be added to the polycarbonate resin, and additives include, for example, antioxidant, anti-coloring agent, ultraviolet absorber, flame retardant, mold release agent, lubricant, antistatic agent, dye and the like.

Moreover, the polycarbonate resin sheet 10 is preferable to have the thickness within a range of 0.3 to 2 mm. When the thickness is less than 0.3 mm, the polycarbonate resin sheet 10 becomes too thin, mechanical properties such as bending strength particularly decrease and a function as a front plate for protecting liquid crystal is liable not to be performed, and on the other hand, when the thickness is more than 2 mm, the polycarbonate resin sheet 10 becomes too thick, a liquid crystal panel unit becomes thick, and a merit as a thin model display device is liable to be weakened.

Furthermore, the polycarbonate resin sheet 10 is typically formed by a melt extrusion method. Regarding the polycarbonate resin sheet formed by a melt extrusion method, molecules constituting a polycarbonate resin have orientation (stretch orientation of polycarbonate molecules) due to influences of resin temperature, cooling roll temperature, take-up speed and the like, thereby double refraction occurs, and retardation occurs.

In the invention, by making the minimum value of retardation within a surface to be not less than 5000 nm, variations of retardation within a surface will not be a problem.

The production method for making the polycarbonate resin sheet 10 retardation to be 5000 nm is not particularly limited, but for example, by increasing the take-up speed and increasing the stretch ratio in the flow direction of a polycarbonate resin, the polycarbonate resin sheet 10 with high retardation of not less than 5000 nm can be obtained.

(Hard Resin Layer)

The front plate 1 of a TN liquid crystal display device according to the invention is, as shown in FIG. 1, preferable to have a hard resin layer 20 provided on a front surface or both of front and back surfaces (only on the front surface in FIG. 2) of the polycarbonate resin sheet 10. Here, the hard resin layer 20 refers to a layer formed with the polycarbonate resin sheet 10 or formed on the polycarbonate resin sheet 10 with a purpose of improving scratch resistance and surface hardness. Materials constituting the hard resin layer 20 are not particularly limited as long as the desired scratch resistance and surface hardness can be ensured, and for example, a (meth)acryl resin can be used.

Moreover, the hard resin layer 20 is preferable to have the thickness within a range of 30 to 100 μm, in terms of ensuring the desired scratch resistance and surface hardness. When the thickness is less than 30 μm, it is liable not to have sufficient scratch resistance and surface hardness, and on the other hand, when the thickness is more than 100 μm, a layer is too thick and impact resistance and processability of the front plate 1 of a TN liquid crystal display device are liable to decrease.

Furthermore, the hard resin layer 20 is preferable to have the pencil hardness at a laminated state measured according to JIS5600-5-4 of at least F or more, preferably H or more, in terms of ensuring the desired scratch resistance and surface hardness. Since the pencil hardness of a polycarbonate resin is only about 2B, it is not preferable as a liquid crystal front surface protecting plate as it is, but by providing the hard resin layer 20 on the surface of the polycarbonate resin sheet 10 so that the pencil hardness is F or more, the surface becomes hard to be scratched and it becomes possible to ensure minimum performance as a front surface protecting plate. Moreover, if the pencil hardness of a sheet having the hard resin layer 20 laminated is F or more, it is possible to increase the pencil hardness at a laminated state after hard coating to about 3H, and grant sufficient performance as a liquid crystal front surface protecting plate.

In addition, although it is also possible to provide the hard resin layer 20 by a thermal lamination method and the like, one provided therewith by coextrusion molding with the polycarbonate resin is preferable. A device used for coextrusion molding includes, for example, a multilayer molding machine comprising one main extruder for extruding a polycarbonate resin and sub extruders for extruding resins constituting the hard resin layer 20. Normally, the sub extruder which is smaller than the main extruder is adopted. The temperature condition of the main extruder is normally 230 to 290° C., preferably 240 to 280° C., and the temperature condition of the sub extruder accordingly depends on the kind of the hard resin layer and is normally 220 to 270° C., preferably 230 to 260° C. since a difference with the set temperature condition of the main extruder is preferable to be smaller. Also, in order to remove foreign substances within a resin, it is preferable to arrange a polymer filter on the upper stream side than a T die of the extruder.

As a method for laminating two kinds of molten resins, well known methods such as feed block type and multi manifold type can be used. In this case, molten resins laminated by the feed block are led to a sheet molding die such as a T die, molded into a sheet state, and led by a molding roll (polishing roll) having a surface mirror-treated to form a melt bank (resin rich area) between two molding rolls. This sheet state molded product is subjected to mirror finishing and cooling during passing through molding rolls to form a laminate. Also, in the case of a multi manifold die, although laminating is conducted after each molten resin is expanded into a sheet state inside the die, subsequently, similarly to the feed block type, it is subjected to mirror finishing and cooling with a molding roll to form a laminate. The die temperature is normally 250 to 310° C., preferably 260 to 300° C., and the molding roll temperature is normally 90 to 190° C., preferably 100 to 180° C. The roll molding machine can accordingly use a vertical type roll molding machine or a horizontal type roll molding machine.

Moreover, the hard resin layer is preferable to comprise an acryl resin, a resin (nuclear hydrogenated MS resin) obtained by hydrogenating an aromatic ring of a copolymer obtained by polymerizing at least one kind of (meth)acrylate ester monomer and at least one kind of aromatic vinyl monomer, or a modified polycarbonate resin having 2,2-bis (4-hydroxy-3-methylphenyl)propane or 2,2-bis(4-hydroxy-3-methylphenyl)cyclohexane as a main raw material monomer.

The acryl resin is preferable to have methyl methacrylate as a main raw material monomer and the glass transition temperature of not less than 95° C. It is because when the glass transition temperature is less than 95° C., in addition to difficulty in ensuring heat resistance required for a liquid crystal front plate, a decrease in surface hardness is recognized. It should be noted that "methyl methacrylate as a main raw material monomer" means having methyl methacrylate in not less than 50%, preferably not less than 70% of all raw material monomers. By having methyl methacrylate as a main raw material monomer, it becomes possible to ensure adhesion with a polycarbonate resin sheet in coextrusion molding.

The nuclear hydrogenated MS resin is preferable to be a resin obtained by partially hydrogenating an aromatic ring of a side chain of a copolymer obtained by polymerizing methyl methacrylate and styrene, to have a copolymerization ratio of them within a range of 60:40 to 90:10, and to have a hydrogenation ratio of the aromatic ring of not less than 70%. By using the nuclear hydrogenated MS resin, there is an effect of reducing occurrence of a warp of a liquid crystal front plate. When the copolymerization ratio between methyl methacrylate and styrene is less than 60:40, adhesion with a polycarbonate resin is not sufficient and there is the possibility of exfoliating at the interface thereof. On the other hand, when the copolymerization ratio is more than 90:10 or when the hydrogenation ratio of a side chain aromatic ring is less than 70%, the difference in performance between normal methyl methacrylate and MS resin (copolymer of methyl methacrylate and styrene) becomes small, and there become less merits of choosing to use it.

The modified polycarbonate resin is preferable to be a copolymer of 2,2-bis(4-hydroxy-3-methylphenyl)propane and 2,2-bis(4-hydroxyphenyl)propane, and to have a copolymerization ratio of them of 50:50 to 100:0. When the copolymerization ratio between 2,2-bis(4-hydroxy-3-methylphenyl)propane and 2,2-bis(4-hydroxyphenyl)propane is less than 50:50, the pencil hardness decreases and scratch resistance as a liquid crystal front plate is liable to be deteriorated.

Also, the modified polycarbonate resin may be a copolymer of 2,2-bis(4-hydroxy-3-methylphenyl)cyclohexane and 2,2-bis(4-hydroxyphenyl)propane, and a copolymerization ratio of them is preferably 50:50 to 100:0. When the copolymerization ratio between 2,2-bis(4-hydroxy-3-methylphenyl)cyclohexane and 2,2-bis(4-hydroxyphenyl)propane is less than 50:50, the pencil hardness decreases and scratch resistance as a liquid crystal front plate is liable to be deteriorated.

Moreover, it is preferable to add an ultraviolet absorber to the acryl resin, the nuclear hydrogenated MS resin or the modified polycarbonate resin in 0.01 to 3.0% by weight for the purpose of maintaining weather resistance for a long period. Furthermore, in order to prevent heat deterioration of the acryl resin, the nuclear hydrogenated MS resin or the modified polycarbonate resin upon coextrusion molding, an antioxidant and an anti-coloring agent may be added. The antioxidant is preferable to be added in 0.01 to 3% by weight based on the acryl resin, the nuclear hydrogenated MS resin or the modified polycarbonate resin. The anti-coloring agent may be added in 0.01 to 3% by weight. When the total added amount of the ultraviolet absorber, the antioxidant and the anti-coloring agent is less than 0.1% by weight, sufficient weather resistance is not shown. Also, when the total added amount of them is more than 5%, not only can further improvement in weather resistance not be expected, but also 'bleed out' of these additives occurs, which causes whitening or also results in a decrease for adhesion and impact strength.

(Hard Coat Membrane)

The front plate 1 of a TN liquid crystal display device according to the invention is, as shown in FIG. 1, preferable to have a hard coat membrane 30 further formed on a frontmost surface or both of frontmost and backmost surfaces (only on the both of frontmost and backmost surfaces in FIG. 1). Here, the hard coat membrane 30 refers to a membrane formed mainly on the hard resin layer 20 with a purpose of improving scratch resistance, and for example, a membrane formed by thermal curing or active energy ray curing a paint, and the like are used. It should be noted that the frontmost surface of the TN liquid crystal display device front plate refers to a surface closest to the user side of the TN liquid crystal display device front plate and a backmost surface refers to a surface closest to a liquid crystal panel.

As one example of paints to be cured using active energy rays, a resin composition having a photopolymerization initiator as a curing catalyst added to a resin composition, comprising a single or a plurality of monofunctional or multifunctional acrylate monomers or oligomers, is included. Also, thermal curable resin paints include polyorganosiloxane based, crosslinkable acryl based and the like. Such resin compositions include ones commercially available as a hard coat agent for acryl resin or a hard coat agent for polycarbonate resin, and may be accordingly selected in consideration of compatibility with a hard coat application facility.

Among them, from the point of being able to realize high scratch resistance and high productivity, the hard coat membrane 30 is preferable to comprise an ultraviolet curable acryl based resin composition.

Also, if required, other than organic solvents, various stabilizing agents such as ultraviolet absorber, photostabilizer and antioxidant, surfactants such as reveling agent, antifoamer, thickening agent, antistatic agent and anti-fogging agent, and the like may be accordingly added to the paint.

Moreover, the hard coat membrane 30 is preferable to have the thickness within a range of 1 to 20 µm. When the thickness is less than 1 µm, sufficient scratch resistance is liable not to be performed, and on the other hand, when the thickness is more than 20 µm, secondary processability and impact resistance of the front plate 1 of a TN liquid crystal display device are liable to significantly decrease.

Furthermore, the membrane surface of a liquid crystal front plate having the hard coat membrane 30 formed is preferable to have the pencil hardness at a laminated state measured according to JIS5600-5-4 of at least 3H or more, in terms of ensuring the desired scratch resistance.

(Front Plate of TN Liquid Crystal Display Device)

The front plate 1 of a TN liquid crystal display device according to the invention comprises the structure described above, and is also preferably used for an TN liquid crystal display for visually recognizing a 3D image with liquid crystal shutter glasses on. In addition, the TN liquid crystal refers to a liquid crystal adopting a display method called TWISTED NEMATIC.

(Liquid Crystal Display Device)

A liquid crystal display device comprising the front plate 1 of a TN liquid crystal display device according to the invention and a liquid crystal backlight using a white LED light source can be obtained. In this liquid crystal display device, occurrence of interference colour due to parallel nicols caused by retardation of the polycarbonate resin sheet 10 and colour unevenness thereof can effectively be inhibited. Other structures such as a liquid crystal panel are not particularly limited, and ones commercially available can be adopted.

EXAMPLES

Below, although embodiments of the invention will be described in further detail with reference to examples, the embodiments are not limited to these examples.

Example

In an example of the invention, as shown in FIG. 1, the front plate 1 of a TN liquid crystal display device having the hard resin layer 20 (film thickness: 60 μm) on one surface of the polycarbonate resin sheet 10 (film thickness: 0.96 mm) and the hard coat membrane 30 (film thickness: 10 μm) formed on the outmost surfaces was prepared.

Here, a polycarbonate resin constituting the polycarbonate resin sheet 10 was a polycarbonate resin as homopolymer of 2,2-bis(4-hydroxyphenyl)propane, Lupilon E-2000N available from Mitsubishi Engineering-Plastics Corporation. Moreover, a resin constituting the hard resin layer 20 was methyl methacrylate resin Parapet HR-1000L manufactured by Kuraray Co., Ltd. and the pencil hardness at a laminated state measured according to JIS5600-5-4 was 2H. Furthermore, a resin composition constituting the hard coat membrane 30 was an ultraviolet curable acryl based resin composition comprising 90 parts of hexafunctional urethane acrylate oligomer: EB-220 manufactured by Daicel-Cytec Company Ltd., 10 parts of 1,9-nonandioldiacrylate: #260 manufactured by Osaka Organic Chemical Industry Ltd., and 3 parts of 1-hydroxy-cyclohexyl phenyl ketone: 1-184 manufactured by Ciba Specialty Chemicals Inc., and the pencil hardness of the hard coat membrane at a laminated state measured according to JIS5600-5-4 was 3H.

Also, retardation of the polycarbonate resin sheet 10 was 5250 to 6300 nm. Moreover, as a light source of a backlight, a single chip type white LED light source was used.

Comparative Example 1

A front plate of a TN liquid crystal display device of Comparative Example 1 was prepared with the same conditions to Example, except that retardation of the polycarbonate resin sheet 10 was within a range of 2520 to 2800 nm, and a CCFL light source was used as a light source of a liquid crystal backlight.

Comparative Example 2

A front plate of a TN liquid crystal display device of Comparative Example 2 was prepared with the same conditions to Example, except that retardation of the polycarbonate resin sheet 10 was within a range of 2520 to 2800 nm.

Comparative Example 3

A front plate of a TN liquid crystal display device of Comparative Example 3 was prepared with the same conditions to Example, except that a CCFL light source was used as a light source of a liquid crystal backlight.

<Evaluation>

The front plates of a TN liquid crystal display device prepared in Example and Comparative Examples were subjected to the following evaluation.

They were mounted in an actual TN liquid crystal panel, and then incorporated in a liquid crystal display device (3D display manufactured by NVIDIA). Then, an image displayed on a liquid crystal display was observed with TN liquid crystal shutter glasses for 3D (GEFORCE 3D VISION Model: P701) on.

Figure 6:
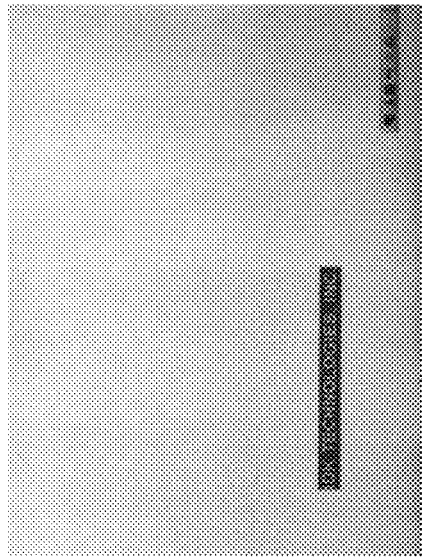
FIG. 6 is a series of photographs where an image of a liquid crystal screen is observed through TN liquid crystal shutter glasses for 3D, wherein (a) is the case of using the front plate of a TN liquid crystal display device of Example and LED as a light source of a liquid crystal backlight, (b) is the case of using the front plate of a TN liquid crystal display device of Comparative Example 1 and CCFL as a light source of a liquid crystal backlight, (c) is the case of using the front plate of a TN liquid crystal display device of Comparative Example 2 and LED as a light source of a liquid crystal backlight, and (d) is the case of using the front plate of a TN liquid crystal display device of Comparative Example 3 and CCFL as a light source of a liquid crystal backlight.
Figure 6:
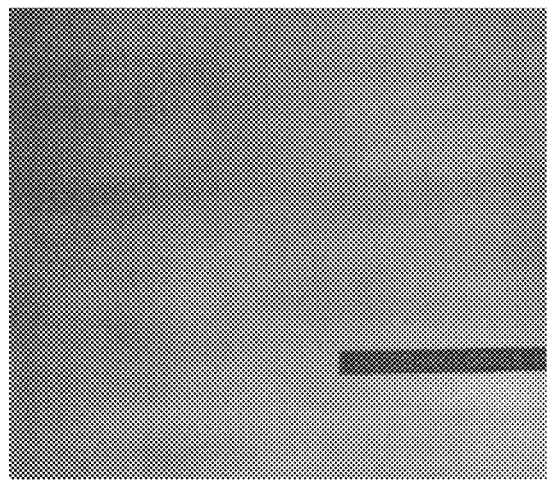
Figure 6:
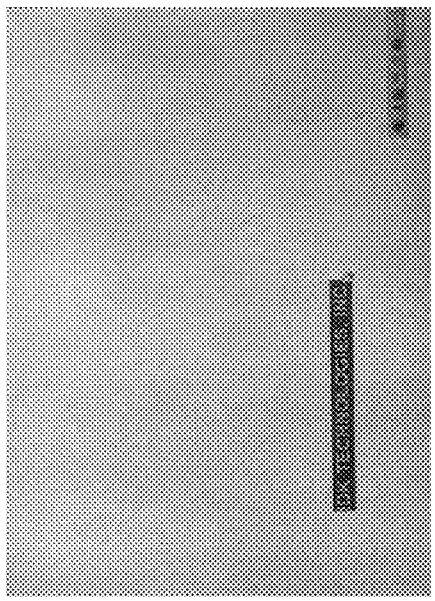
Figure 6:

The result of observing an image on a liquid crystal screen through TN liquid crystal shutter glasses for 3D is shown in FIG. 6. FIG. 6 (a) is a state of using the front plate of a TN liquid crystal display device of Example and LED as a light source of a liquid crystal backlight, FIG. 6 (b) is a state of using the front plate of a TN liquid crystal display device of Comparative Example 1 and CCFL as a light source of a liquid crystal backlight, FIG. 6 (c) is a state of using the front plate of a TN liquid crystal display device of Comparative Example 2 and LED as a light source of a liquid crystal backlight, and FIG. 6 (d) is a state of using the front plate of a TN liquid crystal display device of Comparative Example 3 and CCFL as a light source of a liquid crystal backlight.

As seen from FIGS. 6 (a), (b), (c) and (d), it is clear that an image (FIG. 6 (a)) where the front plate of a TN liquid crystal display device of Example was used significantly improved in occurrence of coloring and color unevenness as compared to images (FIG. 6 (b) to (d)) where the front plates of a TN liquid crystal display device of Comparative Examples 1 to 3 were used. Also, Example and Comparative Examples 1 to 3 were prepared with the same conditions except for the take-up speed upon production, and it is clear that the front plate of a TN liquid crystal display device of Example also had good impact resistance, heat resistance and transparency as similar to the conventional one.

INDUSTRIAL APPLICABILITY

According to the invention, it is possible to provide a front plate of a TN liquid crystal display device capable of inhibiting coloring and color unevenness, caused by retardation of a polycarbonate resin sheet and unevenness thereof, even when the liquid crystal panel is observed through polarizing glasses or liquid crystal shutter glasses for 3D, while having excellent impact resistance, heat resistance and transparency.

EXPLANATION OF NUMERALS 1 front plate of TN liquid crystal display device
10 polycarbonate resin sheet
20 hard resin layer
30 hard coat membrane
100 TN liquid crystal panel
200 liquid crystal shutter glasses for 3D
210 glasses front side polarizing plate
220 twisted nematic liquid crystal layer
230 glasses back side polarizing plate
X direction of slow axis
Y direction of fast axis

What is claimed is:

1. A front plate of a TN liquid crystal display device comprising a polycarbonate resin sheet and using a single chip white LED wherein yellow and red are fluorescence excited to illuminate by blue LED illumination and the balance thereof result in white as a light source of a backlight, and further comprising a hard resin layer with a thickness within a range of 30 to 100 μm and a pencil hardness at a laminated state measured according to JIS5600-5-4 of at least F or more, obtained by coextrusion molding with the polycarbonate resin provided on only a front surface of the polycarbonate resin sheet, wherein a direction of the slow axis or a fast axis of the polycarbonate resin sheet is parallel to a lengthwise direction of the TN liquid crystal panel releasing polarized light of an angle of 45°, and retardation is not less than 5000 nm, wherein the hard resin layer consists of
- a poly methyl methacrylate resin (PMMA),
- a resin (nuclear hydrogenated MS resin) obtained by hydrogenating an aromatic ring of a copolymer obtained by polymerizing methyl methacrylate and styrene, a copolymerization ratio of them is within a range of 60:40 to 90:10, and a hydrogenation ratio of the aromatic ring is not less than 70%, or
- a modified polycarbonate resin having 2,2-bis(4-hydroxy-3-methylphenyl)propane or 2,2-bis(4-hydroxy-3-methylphenyl)cyclohexane as a main raw material monomer, and wherein transmittance $TT(\lambda)$ of following Formula (1), $$TT(\lambda) = \cos^2(\pi \times Re(\lambda)/\lambda) \quad (1)$$

light spectrum $S(\lambda)$ of the light source of the backlight, and each of the color matching functions (spectrum stimulus values) of CIE1931 x ($\lambda$), y ($\lambda$) and z ($\lambda$) are overlap integrated to calculate X, Y and Z and calculate x=X/(X+Y+Z) and y=Y/(X+Y+Z) on the color diagram under 380 to 780 nm of the integrated wavelength region, and a range of $X_{max} - X_{min}$ is 0.04 or less and a range of $Y_{max} - Y_{min}$ is 0.04 or less on the color diagram.

2. A front plate of a TN liquid crystal display device according to claim 1, wherein a polycarbonate resin constituting the polycarbonate resin sheet has 2,2-bis(4-hydroxyphenyl)propane as a main raw material monomer, a viscosity average molecular weight within a range of 20,000 to 30,000, and a glass transition temperature within a range of 130 to 160° C.

3. A front plate of a TN liquid crystal display device according to claim 1, wherein a thickness of the polycarbonate resin sheet is within a range of 0.3 to 2 mm.

4. A front plate of a TN liquid crystal display device according to claim 1, wherein the poly methyl methacrylate resin (PMMA) has a glass transition temperature of not less than 95° C.

5. A front plate of a TN liquid crystal display device according to claim 1, wherein the modified polycarbonate resin is a copolymer of 2,2-bis(4-hydroxy-3-methylphenyl)propane and 2,2-bis(4-hydroxyphenyl)propane, and a copolymerization ratio of them is 50:50 to 100:0.

6. A front plate of a TN liquid crystal display device according to claim 1, wherein the modified polycarbonate resin is a copolymer of 2,2-bis(4-hydroxy-3-methylphenyl)cyclohexane and 2,2-bis(4-hydroxyphenyl)propane, and a copolymerization ratio of them is 50:50 to 100:0.

7. A front plate of a TN liquid crystal display device according claim 1, having a hard coat membrane formed on a frontmost surface or both of frontmost and backmost surfaces of the front plate.

8. A front plate of a TN liquid crystal display device according to claim 7, wherein the hard coat membrane consists of an ultraviolet curable acryl based resin composition, a thickness is within a range of 1 to 20 μm, and a pencil hardness at a laminated state measured according to JIS5600-5-4 is 3H or more.

* * * * *